United States Patent
Jung et al.

(10) Patent No.: US 8,593,789 B2
(45) Date of Patent: Nov. 26, 2013

(54) DEVICE FOR DISTRIBUTING HIGH-VOLTAGE POWER FOR VEHICLE

(75) Inventors: Yunjae Jung, Gyeonggi-do (KR); Kwangsoo Jang, Gyeonggi-do (KR); Seok Kim, Gyeonggi-do (KR); Taehyoung Park, Jeonbuk (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 13/305,278

(22) Filed: Nov. 28, 2011

(65) Prior Publication Data

US 2013/0058011 A1 Mar. 7, 2013

(30) Foreign Application Priority Data

Sep. 2, 2011 (KR) .................. 10-2011-0088939

(51) Int. Cl.
*H02B 1/00* (2006.01)

(52) U.S. Cl.
USPC .................. 361/601; 361/622; 361/624

(58) Field of Classification Search
USPC ....................................... 361/601
See application file for complete search history.

(56) References Cited

U.S. PATENT DOCUMENTS

| | | | |
|---|---|---|---|
| 5,239,202 A * | 8/1993 | Hostetler .................. | 307/116 |
| 7,999,668 B2 * | 8/2011 | Cawthorne et al. ......... | 340/532 |
| 8,199,449 B2 * | 6/2012 | Kuschnarew et al. ........ | 361/88 |
| 2009/0073624 A1 | 3/2009 | Scholer et al. | |
| 2010/0123573 A1 * | 5/2010 | Cawthorne et al. ......... | 340/532 |
| 2011/0002798 A1 * | 1/2011 | Ford ........................ | 417/410.1 |

FOREIGN PATENT DOCUMENTS

| | | |
|---|---|---|
| JP | 1998-502239 A | 2/1998 |
| JP | 2003-324823 A | 11/2003 |
| KR | 10-2004-0009318 | 1/2004 |
| KR | 10-2009-0065542 | 6/2009 |
| KR | 10-2009-0070078 A | 7/2009 |
| KR | 10-2009-0109373 | 10/2009 |
| KR | 10-2011-0037217 A | 4/2011 |
| KR | 10-2011-0061057 | 6/2011 |

* cited by examiner

*Primary Examiner* — Gregory Thompson
(74) *Attorney, Agent, or Firm* — Edwards Wildman Palmer LLP; Peter F. Corless

(57) ABSTRACT

Provided is a device for distributing high-voltage power for a vehicle which supplies the main power of the vehicle to the electronic devices mounted in the vehicle. More specifically, a power distribution unit includes a plurality of first interlock connectors that connect distributed power to the electronic devices through cables, respectively. Furthermore, a switching unit including switching elements is disposed between the power distribution unit and the first interlock connectors and an interlock circuit unit that is connected with the first interlock connectors and the electronic devices and is separated before the cables are separated due to separation or breaking of the first interlock connectors. A switching control unit checks or determines which electronic devices connected with the interlock circuit unit are separated and controls the switching unit so that the distributed power is not supplied to just those effected electronic devices which have been determined to be separated.

5 Claims, 2 Drawing Sheets

DEVICE FOR DISTRIBUTING HIGH-VOLTAGE POWER FOR VEHICLE

CROSS-REFERENCE TO RELATED APPLICATIONS

The present application claims priority to Korean Patent Application Number 10-2011-0088939 filed Sep. 2, 2011, the entire contents of which application is incorporated herein for all purposes by this reference.

BACKGROUND OF THE INVENTION

1. Field of the Invention

The present invention relates to a device for distributing high-voltage power for a vehicle, particularly a device for distribution high-voltage power for a vehicle in which an interlock connector configured to prevent damage due to an arc generated by separation is applied to a distribution line.

2. Description of Related Art

Power supply systems of vehicles in the related art are usually equipped with an interlock connector between high-voltage power supply terminals of a battery and an electronic device that is supplied with high-voltage power from the power supply terminal. The interlock connector is provided to protect the system from a spark or an arc that may be generated when a mechanical contact point is removed, with power being applied.

In the power supply systems of vehicles in the conventional art, the supply of high-voltage power is entirely terminated by a BMS (Battery Management System), when one of the interlock connectors is unexpectedly separated or broken. Since all the power supplied to the devices relating to driving is stopped when one of the interlock connectors, which may or may not be directly related to the actual driving of the vehicles, is unexpectedly separated or broken by, e.g., a small shock or a defect in related parts, the vehicles completely shuts down and prevents the driver from driving the vehicle any further. Thus, a severe accident may occur, depending on the traveling conditions, especially when this shut down is unexpected by the driver.

For example, the main power may cut due to separation or breaking of the interlock connector connected with a positive temperature coefficient heater (PTC) which does not have any actual affect on the safety or drive system in hybrid vehicles or electric vehicles. However, since the main power supply has been cut, the inverter cannot operate the driving motor, which may result in an accident if the vehicle is traveling at the time of shut down.

Further, since all the power is cut even if only one of the interlock connectors is separated in the power supply systems of vehicles in the conventional art, it is difficult to separate and test the interlock connectors one by one, and accordingly, it is difficult to estimate maintenance and project what parts are influenced.

One example, of the above described conventional art is disclosed in Korean Patent Application No. KR 10-2011-0061057 A.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a device for distribution high voltage for a vehicle that is configured to prevent the main power from being cut by separation or breaking of some interlock connectors that are used to supply power in the vehicle, and makes it possible to independently maintain and analyze high-voltage supply lines.

An exemplary embodiment of the present invention provides a device for distributing high-voltage power for a vehicle, including: a power distribution unit configured to distribute the main power inputted from a power source to corresponding electronic devices; first interlock connectors configured to connect distributed power from the power distribution unit to the electronic devices through cables, respectively; a switching unit including switching elements that are disposed between the power distribution unit and the first interlock connectors, respectively, and switch connection of the distributed power with the first interlock connectors; an interlock circuit unit that is connected with the first interlock connectors and the electronic devices and is separated before the cables transmitting the distributed power are separated due to, e.g., a separation or breaking of the first interlock connectors; and a switching control unit that is configured to communicate with the electronic devices, determine which electronic devices with the interlock circuit unit have been separated in the electronic devices, and controls the switching unit so that the distributed power supplied to the electronic devices determined to be separated is not supplied.

The device for distributing high-voltage power for a vehicle may further include a body that houses the power distribution unit and the switching unit, wherein the first interlock connector may include a fixing module connected with the body and the switching element and a detachable module detachably connected to the fixing module and configured to output the distributed power transmitted through the fixing module to outside of the housing/body, and the interlock circuit unit may be separated before the cable is separated due to removal of the detachable module from the fixing module. The switching elements may be disposed in relay, respectively, and common earths of the power distribution unit may be used for coil earths of the relays.

The device for distributing high-voltage power for a vehicle may further include second interlock connectors that are configured to transmit the distributed power, which is transmitted from the first interlock connectors, to corresponding electronic devices through the cables, wherein the interlock circuit unit may be disposed between the first interlock connector and the second interlock connector, and when any one or both of the first interlock connector and the second interlock connector are separated or broken, the interlock circuit unit may be separated before the cables are separated due to the separation or breaking. Fuses corresponding to the distributed power may be disposed between anode electrode terminal of the power distribution unit and the switching unit.

According to exemplary embodiments of the present invention, the device for distributing high-voltage power for a vehicle prevents the entire main power from being cut due to, e.g., a separation or breaking of at least one of the interlock connectors and makes it easier to independently maintain and analyze the high-voltage supply lines by using the interlock connectors and the switching elements of the power distribution unit.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
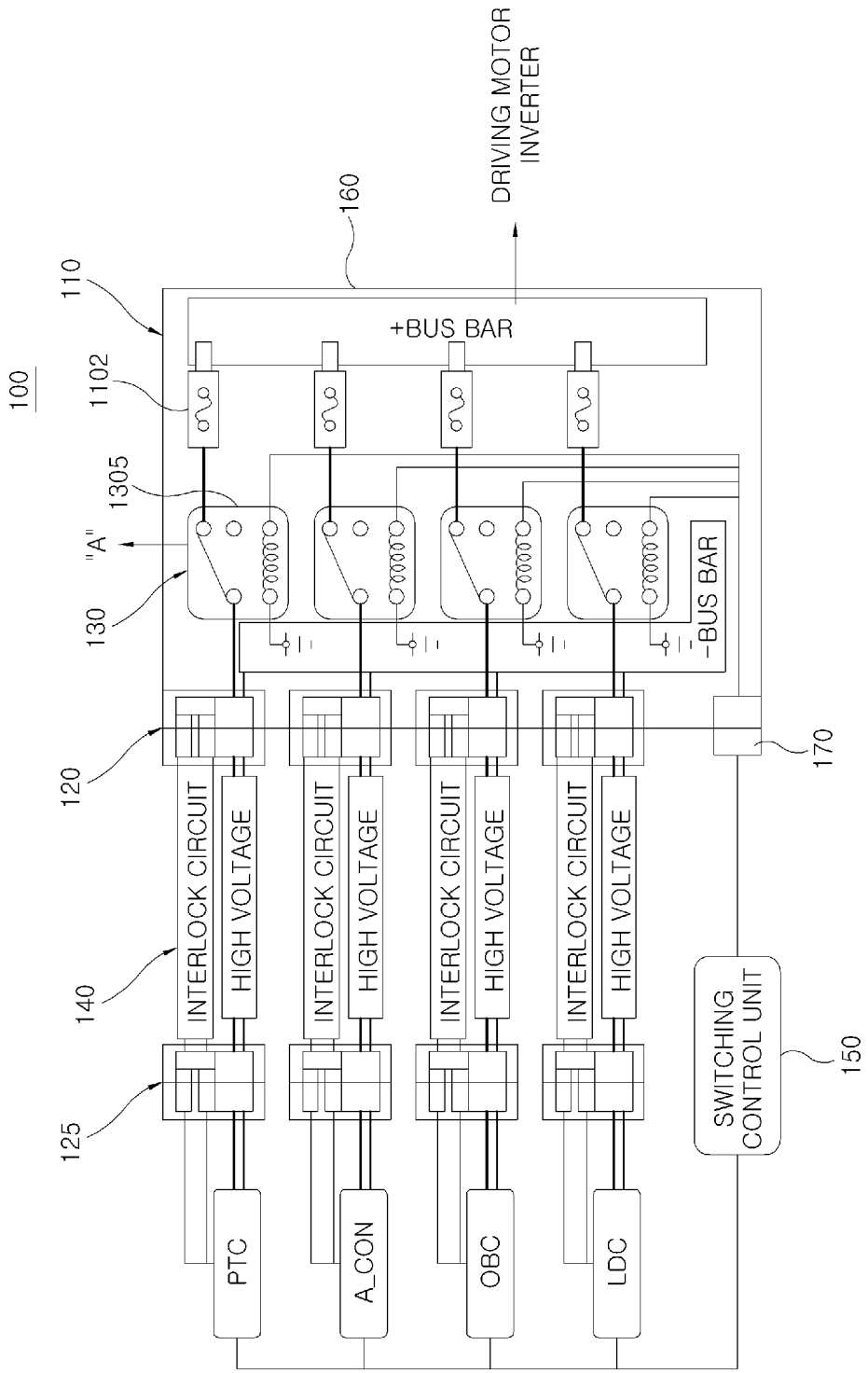
FIG. 1 is a block diagram of a device for distributing high voltage for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of all vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Referring to FIG. 1, a device for distributing high-voltage power for a vehicle 100 is a device that distributes the main power supplied by control of a BMS (Battery Management System) to a positive temperature coefficient heater (PTC), an air-con component (A-CON), an on-board charger (OBC), a low-voltage DC converter (LDC), and an inverter that drives a vehicle driving motor. The device 100 includes a power distribution unit 110, a first interlock connector 120, a second interlock connector 125, a switching unit 130, an interlock circuit unit 140, and a switching control unit 150.

When interlock circuit unit 140 is separated, a device for distributing high-voltage power for a vehicle 100 is configured to cut the power to just the electronic devices connected to the separated interlock connector. As noted above, unlike the conventional art, the present invention is able to prevent termination of power to devices which are unaffected by the separation Power distribution unit 110 supplies corresponding distributed power to a plurality of electronic devices, for example, a positive temperature coefficient heater (PTC), an air-con component (A-CON), an on-board charger (OBC), a low-voltage DC converter (LDC), and an inverter that drives a vehicle driving motor, by using the main power supplied from the main battery mounted in the vehicle under the control of a battery management system (BMS). Fuses 1102 are disposed between anode electrode terminal (e.g., a +BUS BAR) of power distribution unit 110 and switching elements 1305.

As shown in FIG. 1, the distributed power from power distribution unit 110 is transmitted to the positive temperature coefficient heater (PTC), air-con component (A-CON), on-board charger (OBC), and low-voltage DC converter (LDC) through first interlock connector 120 and second interlock connector 125. First interlock connector 120 is connected to one side of a body 160 so that the distributed power from power distribution unit 110 is outputted to correspond to the electronic devices, respectively. Body 160 houses power distribution unit 110 and switching unit 130. That is, first interlock connector 120 is composed of a fixing module 1202 connected with body 160 and connected to a switching element 1305 and a detachable module 1204 detachably connected to fixing module 1202. Detachable module 1204 is connected to second interlock connector 125 by a cable and transmits the distributed power to second interlock connector 125.

Second interlock connector 125 is connected with a corresponding electronic device by a cable and transmits the distributed power transmitted through first interlock connector 120. Second interlock connectors 125 are connected with first interlock connectors 120 by the cables and transmit the distributed power outputted through first interlock connectors 120 to the electronic devices, accordingly.

Switching unit 120 includes switching elements 1305 are disposed between power distribution unit 110 and first interlock connectors 120. Switching elements 1305 switch to connect and disconnect selectively the distributed power from power distribution unit 110 via the control of a switching control unit 150 to corresponding first interlock connectors 120.

Switching elements 1305 may be disposed in relay, and as shown in FIG. 1, a common earth, (e.g., −BUS BAR) of power distribution unit 110 may be used as a coil earth of the relays. A signal for driving the relay coil is transmitted through a relay coil connector 170 disposed through one side of body 160. The signal for driving the relay coil is generated by switching control unit 150.

Interlock circuit unit 140, as shown in FIG. 1, is disposed between first interlock connector 120 and second interlock connector 125 and connected with a corresponding electronic device. Interlock circuit unit 140 is separated before the cable transmitting the distributed power to the electronic device is separated when the cable is separated due to separation or breaking of first interlock connector 120 and/or second interlock connector 125.

Switching control unit 150 communicates with the electronic devices, checks or determines what electronic devices with interlock circuit 140 are separated, and controls switching unit 130 so that distributed power is not supplied to the electronic devices which have been determined to be separated. For example, when the electronic device determined to be separated from interlock circuit unit 140 is the positive temperature coefficient heater (PTC), "A" in switching elements 1305 corresponding to the positive temperature coefficient heater (PTC) in switching unit 130 is opened and the distributed power corresponding to the positive temperature coefficient heater (PTC) is cut. That is, switching control unit 150 supplies a control signal for driving the coil of the relay that is the "A" switching element. The control signal can be transmitted to switching element 1305 through a relay coil connector 170 disposed through one side of body 160. When first interlock connector 120 is composed of a fixing module 1202 and a detachable module 1204, interlock circuit unit 140 is separated even if detachable module 1204 is removed from fixing module 1202.

Figure 2:
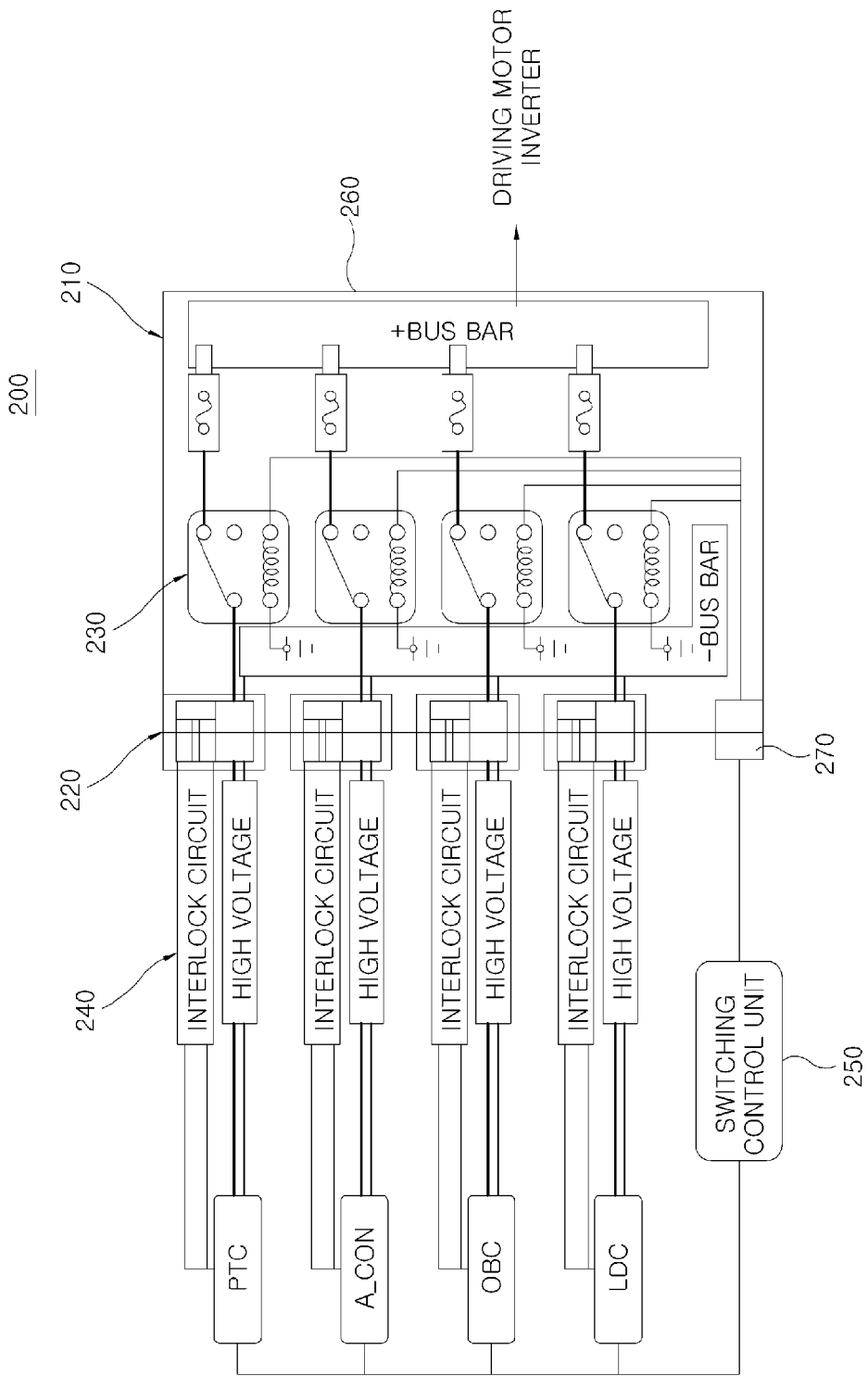
FIG. 2 is a block diagram of a device for distributing high voltage for a vehicle according to another exemplary embodiment of the present invention.

A device for distribution high voltage for a vehicle 200 according to another exemplary embodiment of the present invention is, as shown in FIG. 2, provided with only one interlock connector. That is, second interlock connector 125 is removed in the configuration shown in FIG. 1. A first interlock connector 200 according to the exemplary embodiment connects distributed power from a power distribution unit 210 to electronic devices through cables. An interlock circuit unit 240, as shown in FIG. 2, is disposed between a first interlock connector 220 and a corresponding electronic device and separated before the cable transmitting the distributed power is separated due to separation or breaking of first interlock connector 220. That is, when first interlock connector 220 is separated or broken, interlock circuit unit 240, as shown in FIG. 1, is separated before the cable transmitting the distributed power supplied to the electronic device is separated due to the separation or breaking. Switching control unit 250 checks the electronic devices separated from interlock circuit unit 240 in the connected electronic devices and controls switching unit 230 to cut the distributed power supplied to the electronic devices which have been determined to be separated. Additionally, a signal for driving the relay coil is transmitted through a relay coil connector 270 disposed through one side of body 260.

Device for distributing high-voltage power for a vehicle 200 according to another exemplary embodiment of the present invention can be applied when only one interlock connector is provided in accordance with the structure of the vehicle in which a high-voltage power distribution line is arranged.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for distributing high-voltage power for a vehicle, comprising:

a power distribution unit configured to distribute the main power inputted from a power source to a plurality of corresponding electronic devices;

a first plurality of interlock connectors configured to connect distributed power from the power distribution unit to the plurality of corresponding electronic devices through cables, respectively;

a switching unit including switching elements disposed between the power distribution unit and the first interlock connectors, respectively, and switch connection of the distributed power between the first interlock connectors;

an interlock circuit unit connected with the first interlock connectors and the plurality of corresponding electronic devices and is separated before the cables transmitting the distributed power are separated due to separation or breaking of the first interlock connectors; and a switching control unit configured to communicate with the electronic devices, determines which electronic devices with the interlock circuit unit have been separated, and controls the switching unit so that the distributed power supplied to just electronic devices determined to be effected is cut.

2. The device as defined in claim 1, further comprising a body that houses the power distribution unit and the switching unit, wherein the first interlock connector includes a fixing module connected with the body and connected with the switching element and a detachable module detachably connected with the fixing module and outputting the distributed power transmitted through the fixing module to the outside, and the interlock circuit unit is separated before the cable is separated due to removal of the detachable module from the fixing module.

3. The device as defined in claim 1, wherein the switching elements are disposed in relay, respectively, and common earths of the power distribution unit are used for coil earths of the relays.

4. The device as defined in claim 1, further comprising second interlock connectors configured to transmit the distributed power, which is transmitted from the first interlock connectors, to corresponding electronic devices through the cables, wherein the interlock circuit unit is disposed between the first interlock connector and the second interlock connector, and when any one or both of the first interlock connector and the second interlock connector are separated or broken, the interlock circuit unit is separated before the cables are separated due to the separation or breaking.

5. The device as defined in claim 1, wherein fuses corresponding to the distributed power are disposed between anode electrode terminal of the power distribution unit and the switching unit.

* * * * *